(12) United States Patent
Pedlow, Jr. et al.

(10) Patent No.: US 7,623,662 B2
(45) Date of Patent: Nov. 24, 2009

(54) DEFAULT ENCRYPTION AND DECRYPTION

(75) Inventors: Leo M. Pedlow, Jr., Ramona, CA (US); Davender Agnihotri, Murrieta, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 865 days.

(21) Appl. No.: 10/795,929

(22) Filed: Mar. 8, 2004

(65) Prior Publication Data
US 2005/0097340 A1    May 5, 2005

Related U.S. Application Data

(60) Provisional application No. 60/516,712, filed on Nov. 3, 2003.

(51) Int. Cl.
*H04N 7/167*    (2006.01)
(52) U.S. Cl. .................................. 380/211; 380/239
(58) Field of Classification Search .................. 380/239, 380/211
See application file for complete search history.

(56) References Cited

U.S. PATENT DOCUMENTS

| | | | |
|---|---|---|---|
| 4,771,458 A | 9/1988 | Citta et al. | |
| 4,944,006 A | 7/1990 | Citta et al. | |
| 4,995,080 A * | 2/1991 | Bestler et al. | 380/239 |
| 6,307,939 B1 | 10/2001 | Vigarie | |
| 6,466,671 B1 * | 10/2002 | Maillard et al. | 380/227 |
| 6,587,561 B1 | 7/2003 | Sered et al. | |
| 6,671,284 B1 * | 12/2003 | Yonge et al. | 370/462 |
| 7,194,756 B2 * | 3/2007 | Addington et al. | 725/116 |

OTHER PUBLICATIONS

"System Solution Simulcrypt™", product brochure, Harmonic Inc., 2001.
"How NDS Uses Simulcrypt to Migrate Systems and Set-Top Boxes", NDS World Vision, Issue 18, Date Unknown, Printed from Internet on Nov. 20, 2003.

* cited by examiner

*Primary Examiner*—Nasser G Moazzami
*Assistant Examiner*—Carlton V Johnson
(74) *Attorney, Agent, or Firm*—Miller Patent Services; Jerry A. Miller (57) ABSTRACT

An apparatus for default encryption of content for distribution, consistent with certain embodiments, has a conditional access system. A conditional access management system communicates with and manages the conditional access system. A memory stores default encryption information for use by transmission equipment containing content encryption capability to encrypt certain content upon a communication failure between the content encryption system and the conditional access management system controlling it. This abstract is not to be considered limiting, since other embodiments may deviate from the features described in this abstract without departing from certain embodiments of the invention.

48 Claims, 6 Drawing Sheets

DEFAULT ENCRYPTION AND DECRYPTION

CROSS REFERENCE TO RELATED DOCUMENTS

This application claims priority benefit of U.S. Provisional Patent Application Ser. No. 60/516,712, to Pedlow, Jr. et al., filed Nov. 3, 2003 entitled "Method for Continuous Delivery of Secure Digital Content", which is hereby incorporated by reference. This application is also related to patent application entitled "Critical Packet Partial Encryption" to Unger et al., Ser. No. 10/038,217; patent application entitled "Time Division Partial Encryption" to Candelore et al., Ser. No. 10/038,032; entitled "Elementary Stream Partial Encryption" to Candelore, Ser. No. 10/037,914; entitled "Partial Encryption and PID Mapping" to Unger et al., Ser. No. 10/037,499; and entitled "Decoding and Decrypting of Partially Encrypted Information" to Unger et al., Ser. No. 10/037,498 all of which were filed on Jan. 2, 2002 and are hereby incorporated by reference herein.

COPYRIGHT NOTICE

A portion of the disclosure of this patent document contains material which is subject to copyright protection. The copyright owner has no objection to the facsimile reproduction of the patent document or the patent disclosure, as it appears in the Patent and Trademark Office patent file or records, but otherwise reserves all copyright rights whatsoever.

BACKGROUND

Figure 1:
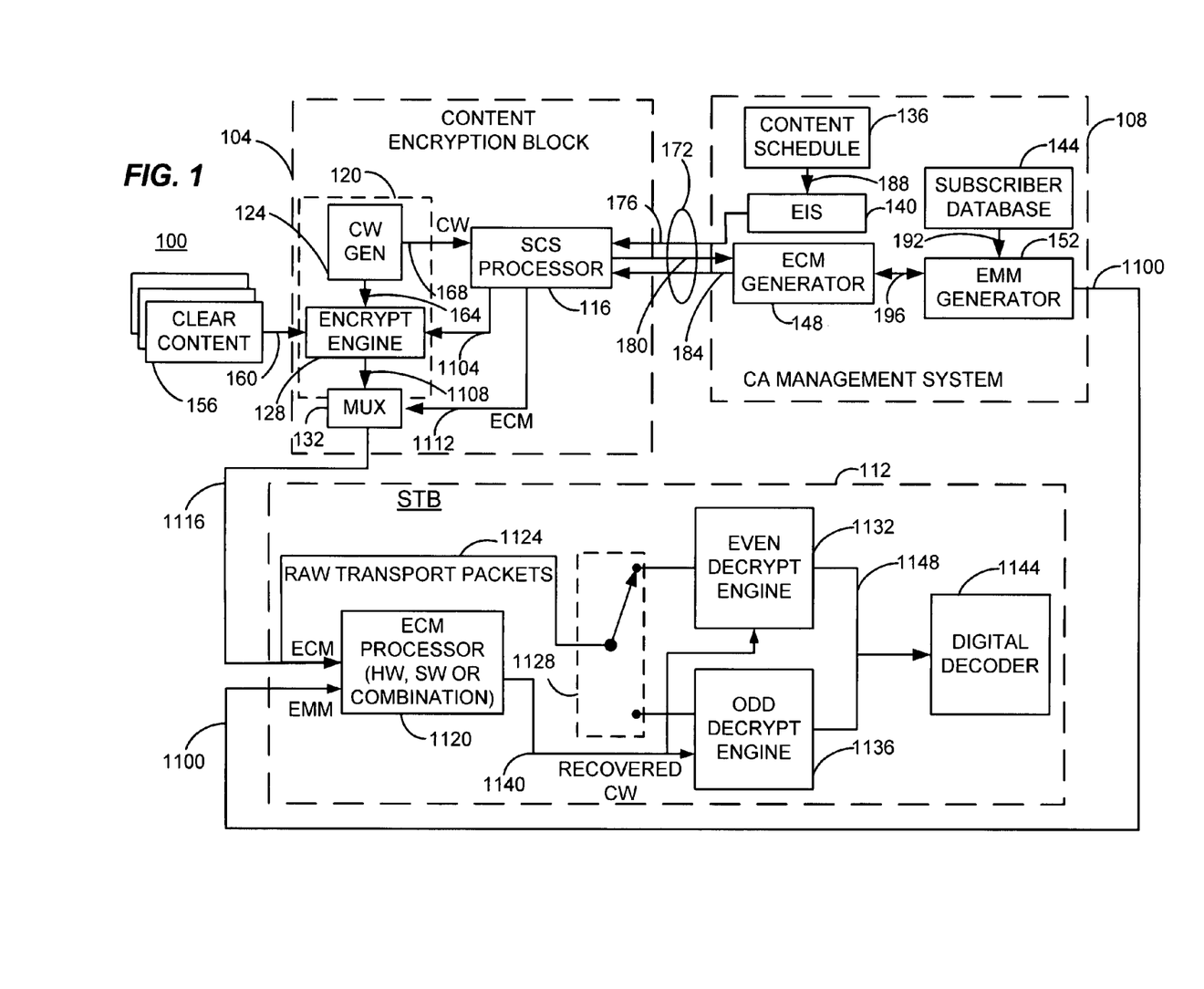
FIG. 1 is a block diagram of a typical pre-existing cable system.

FIG. 1 shows one possible configuration of a DVB system 100. This example system complies with the Digital Video Broadcast (DVB) specification (but the inventions disclosed hereinafter are not necessarily limited to such systems). Accordingly, all components and interfaces are described in detail in the DVB specification. The detail that is presented here is for background informational use. The reader is referred to the DVB specification for specific details beyond those needed for the intended overview presented here.

In FIG. 1, cable system 100 is shown. Content Encryption Block 104, conditional access management system 108 and television Set-Top Box STB 112 are also shown. Within content encryption block 104 (content encryption block 104 and CA management system 108 are generally located at the cable system headend or content distribution broadcast center) are Simulcrypt™ Synchronizer (SCS) Processor 116 and content encryption block 120. Within the content encryption block 120 are code word generator 124 and encrypt engine 128. Output multiplexer (mux) 132 is the final block within content encryption block 104. Details of the communications interfaces within cable system head end will follow. The interfaces described may be hardware interfaces with direct connections as shown or software interfaces for communication over, for example, a bus structure without limitation.

Within conditional access management system 108 are the content scheduler 136, the event information scheduler (EIS) 140, the subscriber database 144, the ECM generator 148 and the EMM generator 152.

With the major components identified so far, an example DVB encryption cycle can be discussed. Clear content 156 is received by encrypt engine 128 on content interface 160. Likewise, the current code word (or encryption key(s)) is received by encrypt engine 128 from code word generator 124 on codeword interface 164. The same codeword is transferred from code word generator 124 to SCS processor 116 on code word interface 168.

Communications between the content encryption block 104 and conditional access management system 108 occurs over the encryption device to conditional access system communications link 172. Conditional access system communications link 172 is composed of several other interfaces, namely access criteria interface 176, code word and access criteria interface 180 and signed ECM interface 184.

During the typical DVB encryption cycle, EIS 140 receives information from content scheduler 136 on content schedule interface 188 and transmits this information to SCS processor 116 on access criteria interface 176. SCS processor 116 then transmits the code word received from code word generator 124 on code word interface 168 and the access criteria received from EIS 140 on access criteria interface 176 to ECM generator 148 across code word and access criteria interface 180.

Likewise, EMM generator 152 interfaces with subscriber database 144 across subscriber database interface 192 to retrieve information necessary to create EMM messages. ECM generator 148 and EMM generator 152 communicate across ECM/EMM interface 196 to communicate information that is necessary for ECM generator 148 to create signed ECM messages. EMM packets are transferred to STB 112 across EMM packet interface 1100 and signed ECM messages are transferred from ECM generator 148 to SCS processor 116 across signed ECM interface 184 to complete the current actions of the conditional access management system 108.

SCS processor 116 then asserts a period switch command to the encrypt engine 128 across period switch interface 1104. Encrypt engine 128 then outputs an encrypted stream of data on interface 1108 to output MUX 132 while SCS processor 116 transmits the signed ECM message (intended to be placed into the outgoing transport stream) across signal ECM insertion interface 1112 to output MUX 132. The final encrypted transport stream with ECMs inserted is then output from content encryption block 104 on transport stream interface 1116. Keep in mind that transport stream interface can be any of a cable network, satellite connectivity, or any other suitable communication medium.

At STB 112, the transport stream is received and ECM processor 1120 strips out the ECM packets from 1116. The raw transport packets are passed along transport packet interface 1124 to the Cryptoperiod switch 1128, which switches periodically between even decrypt engine 1132 and odd decrypt engine 1136. EMM packets are received on EMM packet interface 1100 (again any suitable communication medium, for example an out of band delivery mechanism per the DVB specification, connects EMM generator 152 and ECM processor 1120) by ECM processor 1120. A recovered code word is output to both the even decrypt engine 1132 and the odd decrypt engine 1136 across recovered code word interface 1140. Finally, clear transport data is transmitted to the digital decoder 1144 across clear transport interface 1148.

Many details of timing and forwarding of codewords and other interactions between the components of the system have been omitted to simplify the previous discussion. The reader is again referred to the DVB specification for specific details of the components, interfaces, and relevant timings. It is believed sufficient for the purposes of this disclosure to generally understand the architecture, as presented herein, with reference to the DVB specification for specific details.

The Passage™ initiative, promoted by Sony, provides a mechanism for MSOs to deploy non-legacy headend equipment, subscriber devices and services on their existing legacy networks. In the USA, these networks are supplied by either Motorola (former General Instrument) or Scientific Atlanta. These two companies at present constitute better than a 99% share of the US cable system market as turnkey system providers. The systems, by design, employ proprietary technology and interfaces precluding the introduction of non-incumbent equipment into the network. An MSO, once choosing one of these suppliers during conversion from an analog cable system to a digital cable system, faces a virtual monopoly when seeking suppliers for additional equipment as their subscriber base or service offering grows.

Before the Passage™ initiative, the only exit from this situation was to forfeit the considerable capital investment already made with the incumbent provider, due to the intentional incompatibility of equipment between the incumbent and other sources. One primary barrier to interoperability is in the area of conditional access systems, the heart of addressable subscriber management and revenue collection resources in a modern digital cable network.

The Passage™ technologies were developed to allow the independent coexistence of two or more conditional access systems on a single, common plant. Unlike other attempts to address the issue, the two systems operate with a common transport stream without any direct or indirect interaction between the conditional access systems. The basic processes used in these technologies are discussed in detail in the above-referenced pending patent applications.

The above-referenced commonly owned patent applications, and others, describe inventions relating to various aspects of methods generally referred to herein as partial encryption or selective encryption, consistent with certain aspects of Passage™. More particularly, systems are described therein wherein selected portions of a particular selection of digital content are encrypted using two (or more) encryption techniques while other portions of the content are left unencrypted. By properly selecting the portions to be encrypted, the content can effectively be encrypted for use under multiple decryption systems without the necessity of encryption of the entire selection of content. In some embodiments, only a few percent of data overhead is consumed to effectively encrypt the content using multiple encryption systems. This results in a cable or satellite system being able to utilize Set-top boxes (STB) or other implementations of conditional access (CA) receivers from multiple manufacturers in a single system—thus freeing the cable or satellite company to competitively shop for providers of Set-top boxes.

In each of these disclosures, the clear content is identified using a primary Packet Identifier (PID). A secondary PID (or shadow PID) is also assigned to the program content. Selected portions of the content are encrypted under two (or more) encryption systems and the encrypted content transmitted using both the primary and secondary PIDs (one PID or set of PIDs for each encryption system). The so-called legacy STBs operate in a normal manner decrypting encrypted packets arriving under the primary PID and ignoring secondary PIDs. The newer (non-legacy) STBs operate by associating both the primary and secondary PIDs with a single program. Packets with a primary PID are decoded normally and packets with a secondary PID are first decrypted then decoded. The packets associated with both PIDs are then assembled together to make up a single program stream. The PID values associated with the packets are generally remapped to a single PID value for decoding (shadow PIDs remapped to the primary PID value or vice versa.)

In certain encrypted digital broadcast transmission systems, regardless of the delivery medium (cable, DBS, DSL, etc.), content at some point prior to transmission to the terminal devices passes through an encryption device designed to obscure the digital content from unauthorized access. These devices use published encryption algorithms such as DES, DES-ECB, DVB-CSA, AES and other methods such as proprietary encryption systems, and typically are dynamically managed by a conditional access system that manages all the encryption devices in a facility. The conditional access system determines which services on each transport should be encrypted and supplies the access criteria, which are the credentials that each particular subscriber terminal device must possess in order to access and display the material. The actual key used by the encryption device to encrypt the data stream passing through the device, depending upon component and system vendor, may either be supplied by the encryption device or the conditional access system itself.

The conditional access system also is responsible for forming special messages sent to the subscriber terminal devices, called entitlement control messages (ECMs) that contain the content encryption key and the access criteria for the content. The data payload in the ECM is itself encrypted, but using a different algorithm than the content itself. The ECM encryption algorithm is a proprietary technology of the conditional access system provider and a closely guarded secret. The ECMs can be inserted in the transport stream at the encryption device or sent through other means and are used by the conditional access agent inside each subscriber terminal device to recover the content encryption key, if authorized for viewing, and supply it the transport decryption element in the terminal device to recover the clear-text content.

In a DVB based system, the conditional access system supplies the access criteria to an element, which may be integrated within the encryption device itself, called a Simulcrypt synchronizer (SCS). The SCS manages the timing and delivery of data between the key generator, ECM inserter and stream encryption engine, which can be elements within the encryption device and the conditional access management system, external to the encryption device.

The conditional access management system provisions the encryption device, indicating the MPEG services within the processed transport stream(s) to encrypt. This indication can either be at the service or at the component level and according to the MPEG transport protocol, a service may contain any combination of encrypted and clear elementary stream components. When the encryption device determines that the system key period (cryptoperiod) is near expiration, the key generator creates a new random key to be used to encrypt or "sign" the service components that are being encrypted. This new key is delivered to the SCS. In parallel, the conditional access management system delivers the access criteria associated with a particular MPEG service to the SCS as well. The access criteria changes relatively infrequently, as often as once per one to two hours for pay-per-view content, to as seldom as monthly or yearly (or longer) in the case of advertising-based subscription television services where the only reason for encryption is to stop non-cable customers from stealing service. An example of the latter might be the Discovery Channel or TLC services, as opposed to true subscription (HBO or Showtime) or pay-per-view services, which carry no supporting advertising and revenues are derived from subscriptions for the content itself.

The SCS retains the access criteria supplied by the conditional access management system for each encrypted service until either the service is provisioned for non-encrypted delivery (clear service) or the data is superseded with newer access criteria. Whenever the key generator delivers a new key to the SCS, it bundles the key and current access criteria for the encrypted service and sends this prototype message to the entitlement control message generator (ECMG), part of the conditional management system, for encryption or "signing" with the proprietary algorithm as described earlier. The signed ECM is sent by the ECMG back to the SCS in the encryption device. The SCS takes the delivered ECM and places the new ECM in the outgoing, encrypted transport stream. After a predetermined period to allow time for subscriber terminal devices to recover and decode the new ECM message, the SCS then issues the new key to the stream encryption engine as a replacement for the old key in the encryption of the indicated service. This entire process is repeated every cryptoperiod (seconds) and is performed in parallel within the encryption device for each indicated service in the transport multiplex processed by the device since no two services use the same key. The conditional access management system independently delivers access criteria for every encrypted service in the channel plan as well as performing ECM signing for each encrypted service every cryptoperiod.

BRIEF DESCRIPTION OF THE DRAWINGS

The features of the invention believed to be novel are set forth with particularity in the appended claims. The invention itself however, both as to organization and method of operation, together with objects and advantages thereof, may be best understood by reference to the following detailed description of the invention, which describes certain exemplary embodiments of the invention, taken in conjunction with the accompanying drawings in which:

ACRONYMS, ABBREVIATIONS AND DEFINITIONS

ASI—Asynchronous Serial Interface
CA—Conditional Access
CASID—Conditional Access System Identifier
CPE—Customer Premises Equipment
DHEI—Digital Headend Extended Interface
ECM—Entitlement Control Message
EPG—Electronic Program Guide
GOP—Group of Pictures (MPEG)
MPEG—Moving Pictures Experts Group
MSO—Multiple System Operator
PAT—Program Allocation Table
PID—Packet Identifier
PMT—Program Map Table
PSI—Program Specific Information
QAM—Quadrature Amplitude Modulation
RAM—Random Access Memory
SAN—Storage Area Network
VOD—Video on Demand
Critical Packet—A packet or group of packets that, when encrypted, renders a portion of a video image difficult or impossible to view if not properly decrypted, or which renders a portion of audio difficult or impossible to hear if not properly decrypted. The term "critical" should not be interpreted as an absolute term, in that it may be possible to hack an elementary stream to overcome encryption of a "critical packet", but when subjected to normal decoding, the inability to fully or properly decode such a "critical packet" would inhibit normal viewing or listening of the program content.

Selective Encryption (or Partial Encryption)—encryption of only a portion of an elementary stream in order to render the stream difficult or impossible to use (i.e., view or hear).

Dual Selective Encryption—encryption of portions of a single selection of content under two separate encryption systems.

Passage™—Trademark of Sony Electronics Inc. for various single and multiple selective encryption systems, devices and processes.

The terms "a" or "an", as used herein, are defined as one, or more than one. The term "plurality", as used herein, is defined as two or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically. The term "program", as used herein, is defined as a sequence of instructions designed for execution on a computer system. A "program", or "computer program", may include a subroutine, a function, a procedure, an object method, an object implementation, in an executable application, an applet, a servlet, a source code, an object code, a shared library/dynamic load library and/or other sequence of instructions designed for execution on a computer system.

The terms "scramble" and "encrypt" and variations thereof may be used synonymously herein. Also, the term "television program" and similar terms can be interpreted in the normal conversational sense, as well as a meaning wherein the term means any segment of A/V content that can be displayed on a television set or similar monitor device. The term "video" is often used herein to embrace not only true visual information, but also in the conversational sense (e.g., "video tape recorder") to embrace not only video signals but associated audio and data. The term "legacy" as used herein refers to existing technology used for existing cable and satellite systems. The exemplary embodiments of fail-safe content encryption and more specifically the decryption elements associated with this technology disclosed herein can be employed in a television Set-Top Box (STB), but it is contemplated that such technology will soon be incorporated within television receivers of all types whether housed in a separate enclosure alone or in conjunction with recording and/or playback equipment or Conditional Access (CA) decryption module or within a television set itself.

The term "encryption device" and variations thereof can be interpreted as a component or assemblage of components that implement the system function of providing cryptographic encryption of clear content passing through the device, as well as the creation, processing and insertion of supporting messages, in whole or in part, such as ECMs, etc. The term "decryption device" and variations thereof can be interpreted as a component or assemblage of components that implement the system function of decrypting encrypted content to retrieve the initial clear content.

DETAILED DESCRIPTION OF THE INVENTION

While this invention is susceptible of embodiment in many different forms, there is shown in the drawings and will herein be described in detail specific embodiments, with the understanding that the present disclosure is to be considered as an example of the principles of the invention and not intended to limit the invention to the specific embodiments shown and described. In the description below, like reference numerals are used to describe the same, similar, or corresponding parts in the several views of the drawings.

The message traffic between elements of a conditional access system and an encryption device contained within the conditional access management system (typically the cable system head end) is both time critical and non-homogeneously distributed. The encryption device has no idea a priori which services are intended to be encrypted, what the access criteria should be or when it may change. If communication between the encryption device(s) (within the conditional access management system—cable system head end) and the conditional access system is lost, the encryption device will continue to use the last received access criteria information indefinitely and continue to use the current ECM and corresponding encryption key, regardless of cryptoperiod expiration, since no new signed ECMs have been received to replace the one currently being used (stale ECMs). This situation maintains the basic safekeeping of the transmitted content, since encryption continues, but could allow the content to be more easily attacked using empirical methods and possibly recovered since the key is static. It will be understood that the term encryption, as used herein, can be either selective encryption or full encryption without limitation.

For pay-per-view services, in the event of a similar communication loss, a paying subscriber will continue to see subsequent programs for free since the access criteria does not change for subsequent programs during a communication loss. With no new access criteria delivered, the subscriber terminals have no indication that a transition from one conditional access event to another has occurred. Restoration of communications will cause the encryption device to renegotiate its connection to the conditional access system and the system will self-restore. Similar results occur if the ECMG or other conditional access management system elements fail after commencement of normal operation.

A different scenario occurs if the encryption device is somehow rebooted or reset during a communication loss with the conditional access management system or, if for whatever reason, the encryption device cannot establish communication with the conditional access system during encryption device initialization after any of a reset, or a cold or warm boot. In these cases, there is no previous key and corresponding signed ECM to continue use of. There is no indication available to the encryption device from the conditional access system regarding which services should be encrypted. In current real-world systems, all content is transmitted entirely in the clear in this scenario, and as a result, anyone with the ability to access the cable plant feed will be able to receive those services with full fidelity.

In the past, there were virtually no ITU-J.83 compliant receiving/decoding devices available to consumers other than the devices supplied by their cable operator. With the Open Cable initiative and advancements in the computing and consumer electronics industries, many devices are now being offered in the consumer marketplace possessing the ability to both receive and decode unencrypted cable content, further complicating the problem. Any programming transmitted without encryption will thus be easily displayed by those devices, without regard for whether the display is authorized. In the case of adult content or other possibly offensive content, there is no way to limit access only to consenting adults in this scenario if there is no encryption of the content, thereby creating possible legal and public relations issues.

One solution to this dilemma is to modify the encryption device to contain in flash memory or any other nonvolatile storage, a list of operator manually configured services indicating which ones may require special consideration due to content (e.g., adult or otherwise objectionable content) or value (e.g., Pay-Per-View, subscription or VOD content) and therefore should always be encrypted. If the encryption device, upon reboot or other initialization, is unable to establish communication with the conditional access management system it automatically begins encryption of the services marked in the configuration table using a predetermined fixed key. No ECM is transmitted while in this state, since none is available (in this particular system state, there is no way to communicate with the conditional access system to have it apply the proprietary algorithm to conceal the content encryption key, therefore and ECM cannot be generated).

By using a default key and suspending any further ECM delivery, no subscriber terminal device will be able to decode the content on the marked streams. While this causes a loss of service in certain situations, it prevents the less desirable situation of uncontrolled delivery of inappropriate content and its ramifications. Once communication is restored or established between the conditional access system and the content encryption device, the encryption device will properly provision and normal key/ECM processing will take place, enabling authorized subscribers to once again be able to access the content.

Throughout the following discussion, the above-referenced patent applications can be referenced for specific details of exemplary embodiments of single and multiple partial encryption as it relates to the present disclosure. It is noted that in all cases, full encryption or selective encryption can be enabled using the embodiments described herein.

Figure 2:
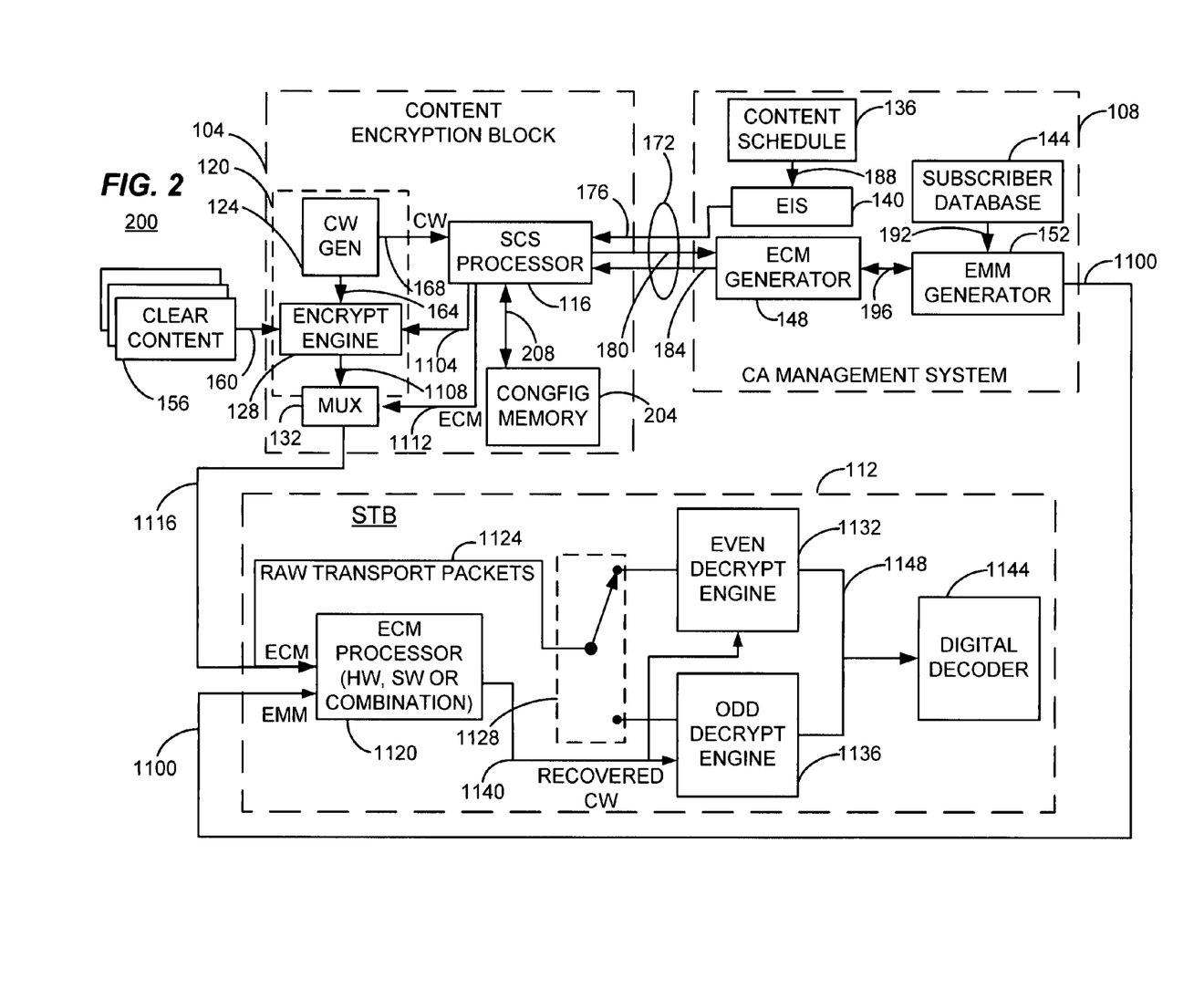
FIG. 2 is a block diagram of a cable system head end consistent with certain embodiments of the present invention.

Turning now to FIG. 2, an illustrative Default Multi-channel Encryption System (DMES) 200 is shown. This figure builds on FIG. 1, with the addition of default configuration memory 204 which is used to store default encryption information for situations of communication failure between content encryption block 104 and conditional access management system 108. One of the possible multiple conditional access systems within the cable system head end is shown as conditional access management system 108. Conditional access management system 108 is responsible for, among other things, assuring encryption of the content of each program that is broadcast from the cable system head end using content encryption block 104. Encryption keys and other related, time-varying information is generated in content encryption block 104 as discussed above and in the published DVB specification. Content encryption block 104 behaves as a conditional access encryption system.

As mentioned above, this encryption information is changed periodically, occasionally, or according to any defined schedule so that content encryption block 104 and conditional access management system 108 attempt to remain in communication, subject to the difficulties discussed above, via conditional access system communications link 172.

In order to resolve the difficulties associated with a loss or absence of communication between conditional access management system 108 and the remainder of the cable system head end, default configuration memory 204 is provided. Default configuration memory 204 can be any non-volatile storage mechanism, such as Flash memory, ROM memory, battery backed up memory, disc storage, or any other suitable computer readable storage medium, so that its contents are persistent through power cycles of the system. Default configuration memory 204 is connected to SCS processor 116 via CA memory interface 208.

SCS processor 116 can be used during set up and initial provisioning of the cable system head end to provide contents for default configuration memory 204, organized on a channel-per-channel basis. A decision can be made by the cable provider regarding the level and type of encryption to be used as a default for all channels provided by the system.

Once initialized, the presence of the default configuration memory 204 allows content encryption block 104 to read default encryption keys and other related information associated with the cable channels in the event of a communication loss between itself and conditional access management system 108. Accordingly, under any of the situation discussed above, content encryption block 104 will always have a capability for encryption using a default encryption key for each cable channel once initialized and provisioned. This prevents broadcast of objectionable and/or premium content (or any other designated content) in the clear to prevent unauthorized recipients from viewing the content. It should be noted that even if the system contains no receiver devices (e.g., STBs) that are appropriately outfitted (as will be described later) to receive content that is encrypted under the default encryption keys, it is often preferred for paid viewers to have their programming disrupted than to have objectionable or otherwise normally protected content transmitted without benefit of encryption.

Thus, an apparatus for default encryption of content for distribution, consistent with certain embodiments, has a conditional access system. A conditional access management system communicates with and manages the conditional access system. A memory device stores default encryption information for use by the conditional access system to encrypt certain content upon a communication failure between the conditional access system and the conditional access management system.

Figure 3:
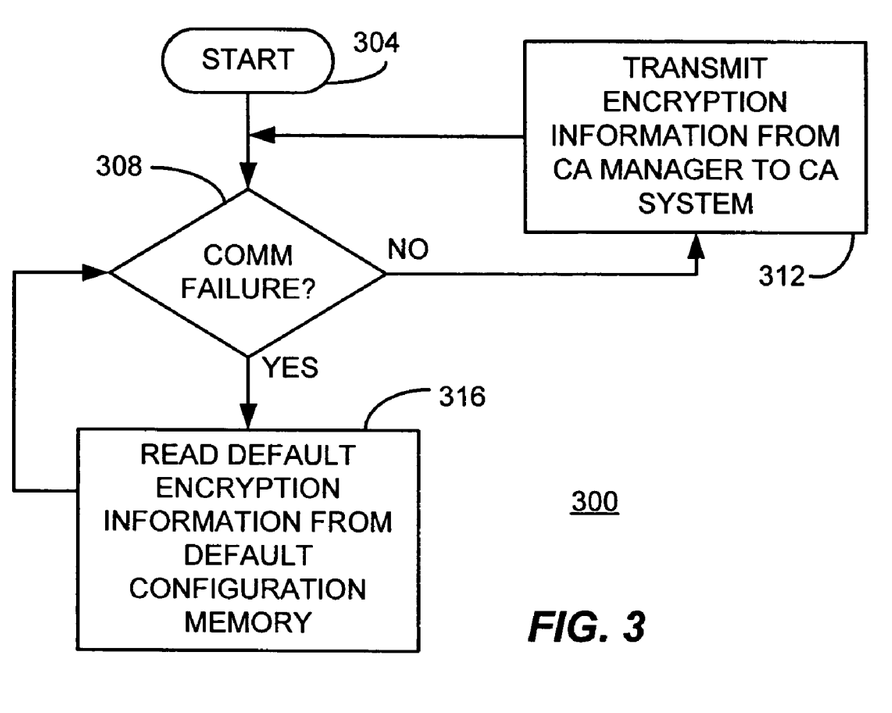
FIG. 3 is a flow diagram of a cable system head end consistent with certain embodiments of the present invention.

Turning now to FIG. 3, an illustrative default encryption information retrieval method 300 is shown. At 304, the method begins. At 308, the process determines whether the communication channel between the conditional access management system 108 and the content encryption block 104 is active and functioning properly or whether there has been a communication failure. Note that, in certain embodiments, the attempted communication occurs every few seconds (or faster), so detection of communication loss or restoration may have a very low latency. If a communication failure has not occurred at 308, a transition is made to 312 to carry out communications to transmit encryption keys and related information from content encryption block 104 of cable system head end to conditional access management system 108 for all channels in the system. Otherwise, if a communication failure is determined to have occurred at 308, a transition is made to 316 where encryption keys and related information is read from the default configuration memory 204 until communication is restored. The communication channel is again checked at 308 where the process repeats during the current power cycle of the equipment.

Figure 4:
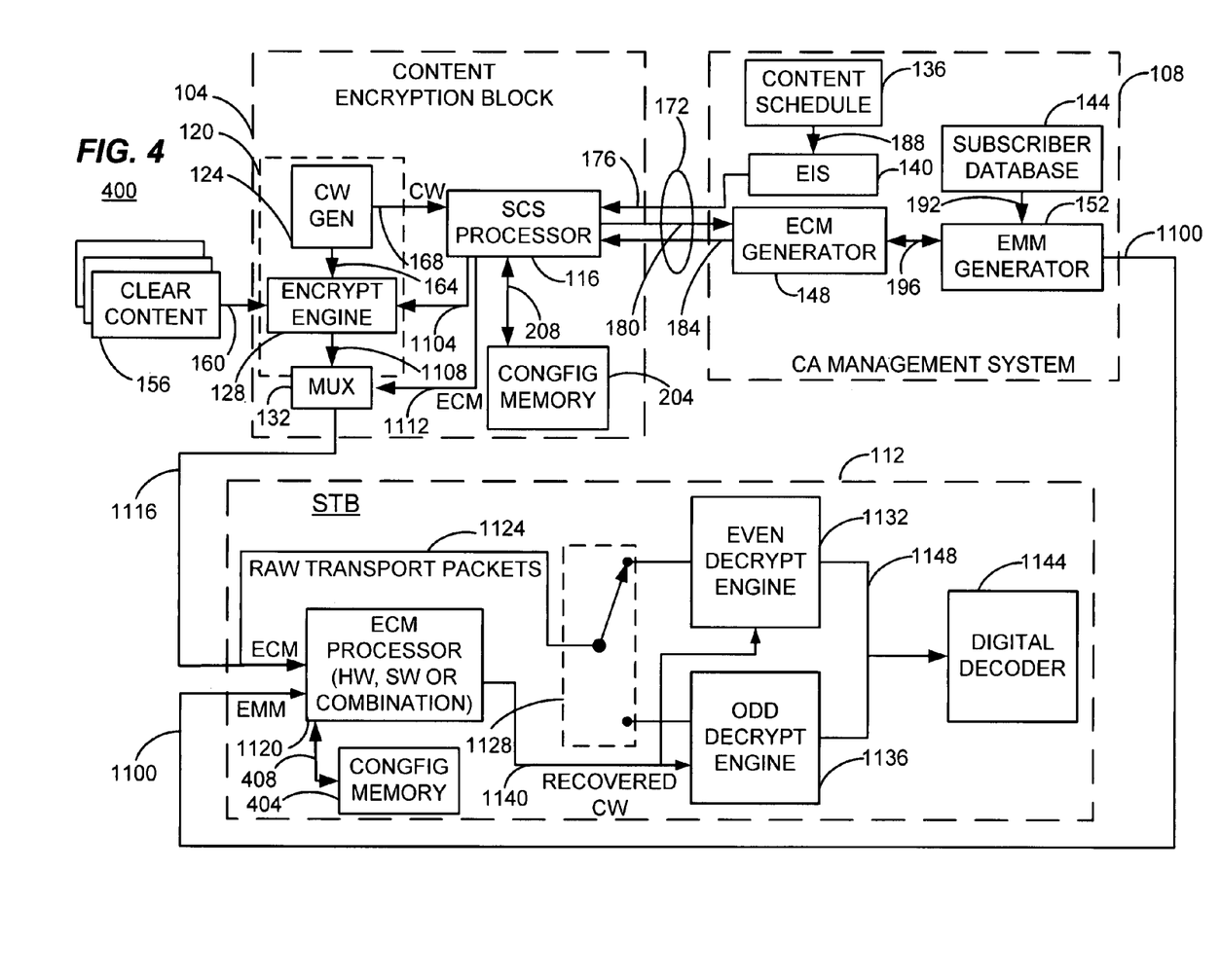
FIG. 4 is a block diagram of a cable system consistent with certain embodiments of the present invention.

Turning now to FIG. 4, an illustrative Default Multi-channel Decryption System (DMDS) 400 is shown. To further extend the capability and to accommodate legally authorized STB's to view content scrambled with a fixed key as described above, an alternative embodiment provides for assignment of a default key or keys to the STB (or other receiver device). In this manner, those legally authorized STBs can be signaled and can temporarily use the default fixed key(s) to descramble content until such time as the live keys can again be injected into the stream. One possibility for the signaling is a specially formatted ECM, originating from the encryption device (since the conditional access management system 108 to the content encryption block 104 connectivity has been lost) and signaling the STB to resort to a fixed-key mode.

In this embodiment, which builds upon FIG. 2, STB 112 includes default configuration memory 404 for storing the default fixed key(s), as discussed above which is interfaced to ECM processor 1120 across CA memory interface 408.

The default fixed key(s) can be the same for all channels, or can be unique for each, or for a group of channels deemed to have a similar characteristic. Alternatively, there could be separate keys for different classes of programming (sports, adult entertainment, performances, etc.), or in accordance with content rating (G, PG, PG-13, R, X, etc.). As well, the fixed keys can be transmitted during the signaling discussed above or can be fixed within the units during manufacture or installation. In any case, the default configuration memory 404 can be any non-volatile memory, such as Flash memory, disc storage, battery backed-up memory, or any other suitable computer readable storage device. Due to the non-volatile nature of the default configuration memory 404, the default fixed key(s) are able to survive a power cycle at the STB 112. Further, by using a one-time programmable memory buried within the decoding device, encryption of the default fixed key(s), or other methods, tampering with, or observation of, the default fixed key(s) can be prevented. As well, secure replacement mechanisms, such as encrypted delivery of new default fixed key(s), are envisioned that prevent tampering or observation of the default fixed key(s) during replacement.

Figure 5:
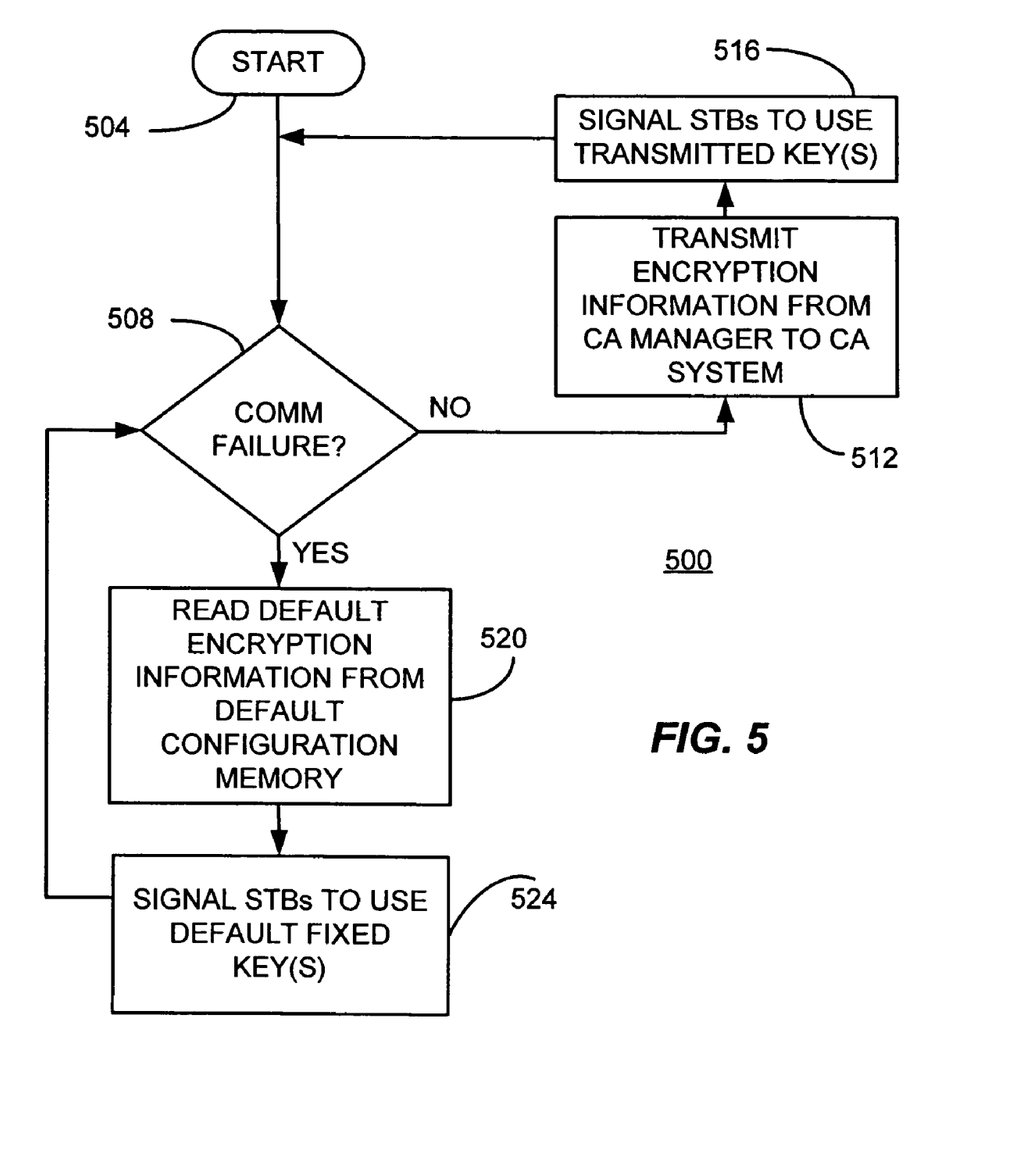
FIG. 5 is a flow diagram of a cable system head end consistent with certain embodiments of the present invention.

Turning now to FIG. 5, an illustrative default encryption information retrieval method 500 is shown. This diagram is very similar to FIG. 3 above with the addition of signaling blocks and is carried out at the cable system head end at content encryption block 104. At 504, the method begins. At 508, the process determines whether the communication channel between the conditional access management system 108 and the content encryption block 104 is active and functioning properly or whether there has been a communication failure. If a communication failure has not occurred at 508, a transition is made to 512 to carry out communications to transmit encryption keys and related information from content encryption block 104 to conditional access management system 108 for all channels in the system. Then at 516, a global signaling to the STBs in the system is done to instruct the STBs to extract encryption keys from the data stream.

If a communication failure is determined to have occurred at 508, a transition is made to 520 where encryption keys and related information are read from the default configuration memory 204 at the content encryption block 104 of the cable system head end until communication is restored. At 524, a global signaling to the STBs in the system is done to instruct the STBs to switch to the default fixed key(s) as discussed above. The communication channel is again checked at 508 where the process repeats during the current power cycle of the equipment.

Figure 6:
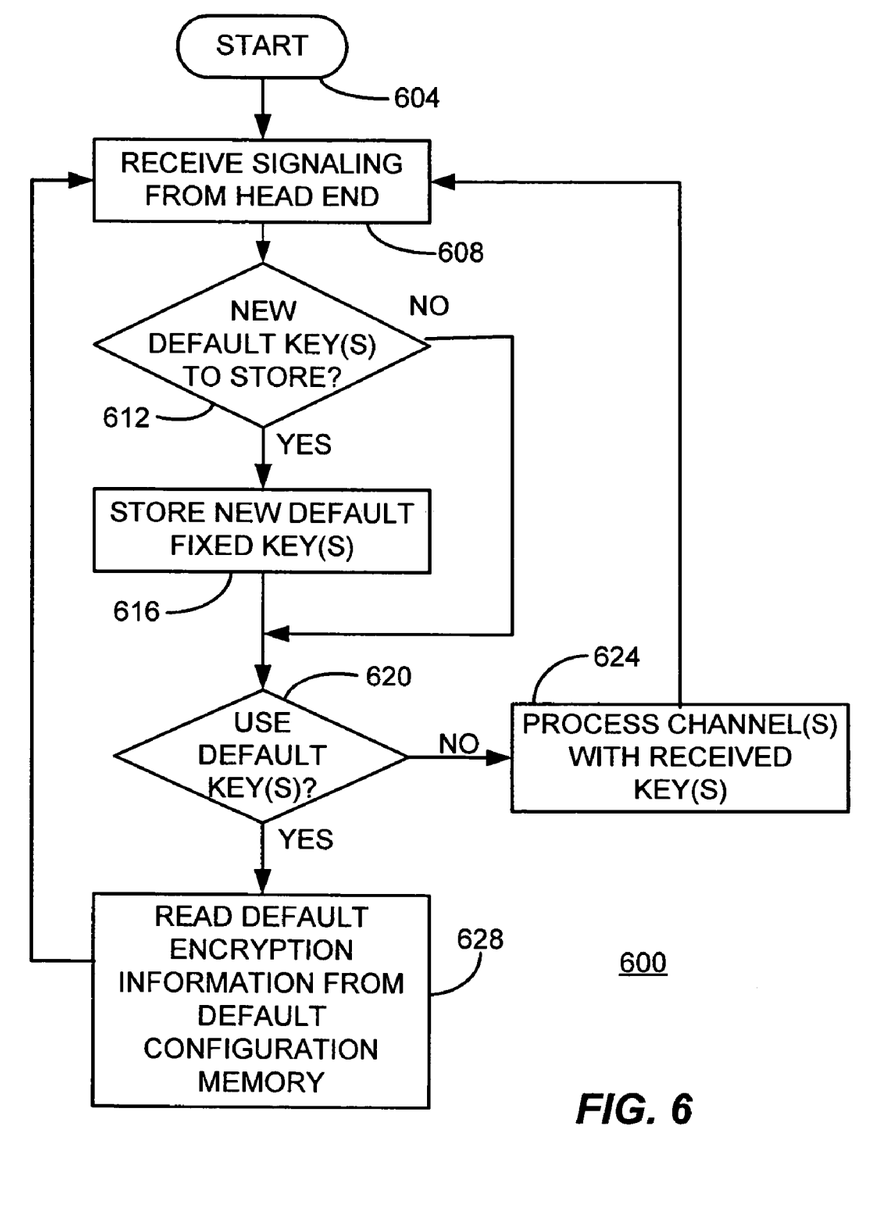
FIG. 6 is a flow diagram of a set-top box consistent with certain embodiments of the present invention.

Turning now to FIG. 6, an illustrative default multi-channel decryption method 600 is shown. With the signaling discussed above in relation to FIG. 5 implemented at cable system head end, this process can be used within the STB to switch between the signaled active decryption key(s) and default fixed key(s). The process begins at 604. At 608, signaling is received from the content encryption block 104 of the cable system head end. As discussed above, this signaling could include the active key(s), new fixed default key(s) to overwrite those stored in memory, and instructions regarding which set of keys to use.

In the case of a communication failure between the content encryption block 104 and the conditional access management system 108, no valid active key(s) would be received. In this case, fixed default key(s) and/or instructions to switch to using the default fixed key(s) are provided. Likewise, new fixed default key(s) can be transmitted based upon the decisions of the cable system provider even without a communication failure in the content encryption block 104. At 612, a determination is made as to whether there are new fixed default key(s). If there are, they can be stored to memory at 616. If there are no new default fixed key(s) to store at 612 or the storage is complete at 616 a transition is made to 620.

At 620, a test is done to determine whether the signaling received at 608 contains instructions to switch to using fixed default key(s). If there were no instructions to switch to using fixed default key(s), processing continues normally with received active key(s) at 624. If, however, there were instructions received at 608 instructing the STB to switch to the use of fixed default key(s), a transition is made to 628 to read fixed default key(s) from memory and processing continues normally with the use of the fixed default key(s). The process repeats during the current power cycle of the equipment.

Thus, in the event of a power failure or other reboot of the system, programming content can be resumed in a manner that will assure encryption of any desired content, such as for example, all content on certain channels (e.g., pay channels or channels that may carry content having a rating greater than or equal to an R rating). This prevents unauthorized viewing of these channels.

Those skilled in the art will recognize that the present invention has been described in terms of exemplary embodiments based upon use of a programmed SCS processor such as SCS processor 116. However, the invention should not be so limited, since certain embodiments could be implemented using hardware component equivalents such as special purpose hardware and/or dedicated processors which are equivalents to the invention as described and claimed. Similarly, general purpose computers, microprocessor based computers, micro-controllers, optical computers, analog computers, dedicated processors and/or dedicated hard wired logic may be used to construct alternative equivalent embodiments.

Those skilled in the art will also appreciate that the program processes and associated data used to implement the embodiments described above can be implemented using disc storage as well as other forms of storage such as for example Read Only Memory (ROM) devices, Random Access Memory (RAM) devices; optical storage elements, magnetic storage elements, magneto-optical storage elements, flash memory, core memory and/or other equivalent storage technologies without departing from the present invention. Such alternative storage devices should be considered equivalents.

Certain embodiments can be implemented using a programmed processor executing programming instructions that are broadly described above in flow chart form that can be stored on any suitable electronic storage medium or transmitted over any suitable electronic communication medium. However, those skilled in the art will appreciate that the processes described above can be implemented in any number of variations and in many suitable programming languages without departing from the present invention. For example, the order of certain operations carried out can often be varied, additional operations can be added or operations can be deleted without departing from certain embodiments of the invention. Error trapping can be added and/or enhanced and variations can be made in user interface and information presentation without departing from the present invention. Such variations are contemplated and considered equivalent.

While the invention has been described in conjunction with specific embodiments, it is evident that many alternatives, modifications, permutations and variations will become apparent to those skilled in the art in light of the foregoing description. Accordingly, it is intended that the present invention embrace all such alternatives, modifications, permutations and variations as fall within the scope of the appended claims.

What is claimed is:

1. An apparatus for default encryption of audio/video content for distribution, comprising:
   a conditional access encryption system that uses changing encryption code words as live encryption keys;
   a conditional access management system that communicates with and manages the conditional access encryption system, wherein the conditional access management system provides the live encryption keys to the conditional access encryption system and periodically changes the live encryption keys; and
   a non-volatile memory storing fixed default encryption information in a configuration table for use by the conditional access encryption system to encrypt certain categories of audio/video content that are always to be encrypted upon a communication failure between the conditional access encryption system and the conditional access management system in which said communication failure results in an inability for the conditional access management system to provide the live encryption keys to the conditional access encryption system which would otherwise result in the audio/video content being distributed unencrypted; and
   where the conditional access encryption system utilizes the fixed default encryption information to provide encryption to the certain categories of audio/video content that are always to be encrypted during times when the communication failure prohibits communication of live encryption keys to the conditional access encryption system.

2. The apparatus of claim 1, wherein the fixed default encryption information comprises fixed default encryption keys.

3. The apparatus of claim 2, wherein the fixed default encryption keys are unique for each of a plurality of channels.

4. The apparatus of claim 1, further comprising a control computer that initializes the configuration memory with the fixed default encryption information.

5. The apparatus of claim 1, wherein the content is encrypted with the fixed default encryption information if a communication failure occurs between the conditional access management system and the conditional access encryption system.

6. The apparatus of claim 1, wherein the content is encrypted with the fixed default encryption information if communication cannot be established between the conditional access management system and the conditional access encryption system.

7. The apparatus according to claim 1, wherein the conditional access system provides selective encryption of the content.

8. An apparatus for default encryption of audio/video content, comprising:
- a conditional access system;
- means for encrypting content in the conditional access system that uses changing encryption code words as encryption keys;
- means for managing the conditional access system, wherein the means for managing provides the live encryption keys to the means for encrypting and periodically changes the live encryption keys;
- means for communicating between the managing means and the encrypting means;
- means for storing fixed default encryption information in a configuration for the conditional access system in a non-volatile manner for use by the conditional access system to encrypt certain categories of audio/video content that are always to be encrypted upon a communication failure between the conditional access system and the managing means in which said communication failure results in an inability for the managing means to provide the means for encryption keys to the means for encrypting which would otherwise result in the audio/video content being distributed unencrypted, where the means for encrypting utilizes the fixed default encryption information to provide encryption to the certain categories of audio/video content that are always to be encrypted during times when the communication failure prohibits communication of live encryption keys to the means for encrypting; and
- means for configuring the storing means with the fixed default encryption information.

9. The apparatus of claim 8, wherein the fixed default encryption information comprises fixed default encryption keys.

10. The apparatus of claim 9, wherein the fixed default encryption keys are unique for each of a plurality of channels.

11. The apparatus of claim 8, wherein the content is encrypted with the fixed default encryption information if a communication failure occurs between the management means and the encrypting means.

12. The apparatus of claim 8, wherein the content is encrypted with the fixed default encryption information if communication cannot be established between the management means and the encrypting means.

13. The apparatus according to claim 8, wherein the conditional access system provides selective encryption of the content.

14. A method of default encryption of audio/video content for distribution, comprising:
- initializing a non-volatile default configuration memory with fixed default encryption information for use in encryption of certain categories of audio/video content that are always to be encrypted;
- communicating with a conditional access management system to retrieve active encryption information for a conditional access system;
- encrypting the certain categories of audio/video content for distribution with the active encryption information;
- distributing the certain categories of audio/video content encrypted with active encryption information;
- if a communication failure occurs between the conditional access management system and the conditional access system in which said communication failure results in an inability for the conditional access management system to provide updated active encryption information to support the encrypting which would otherwise result in the certain categories of audio/video content being distributed unencrypted:
  - reading the fixed default encryption information from the default configuration memory;
  - encrypting the certain categories of audio/video content that are always to be encrypted with the fixed default encryption information;
  - distributing the certain categories of audio/video content encrypted with the fixed default encryption information; and,
- whereby the conditional access encryption system utilizes the fixed default encryption information to provide encryption to the certain categories of audio/video content that are always to be encrypted during times when the communication failure prohibits communication of live encryption keys to the conditional access encryption system.

15. The method of claim 14, further comprising:
- if communication is restored between the conditional access management system and the conditional access system:
  - communicating with the conditional access management system to retrieve active encryption information for the conditional access system;
  - encrypting the certain categories of audio/video content for distribution with the active encryption information; and
  - distributing the certain categories of audio/video content encrypted with active encryption information.

16. The method of claim 14, wherein the fixed default encryption information comprises fixed default encryption keys.

17. The method of claim 16, wherein the fixed default encryption keys are unique for each of a plurality of channels.

18. The method of claim 14, wherein the encryption comprises selective encryption.

19. A computer readable medium storing instructions which, when executed on a programmed processor, carry out the process according to claim 14.

20. A method of default encryption of audio/video content for distribution, comprising:
- initializing a non-volatile default configuration memory with default encryption information;
- attempting to communicate with a conditional access management system to retrieve active encryption information for a conditional access system;
- if communication cannot be established between the conditional access management system and the conditional access system such that said not establishing communication results in an inability for the conditional access management system to provide the active encryption information to the conditional access encryption system which would otherwise result in certain categories of audio/video content that are always to be encrypted being distributed unencrypted:
  - reading the fixed default encryption information from the default configuration memory;
  - encrypting the certain categories of audio/video content with the fixed default encryption information; and
  - distributing the certain categories of audio/video content encrypted with the fixed default encryption information so that the conditional access encryption system utilizes the fixed default encryption information to provide encryption to the certain categories of audio/video content that are always to be encrypted during times when the communication failure prohibits communication of live encryption keys to the conditional access encryption system.

21. The method of claim 20, further comprising:
if communication is achieved between the conditional access management system and the conditional access system:
receiving active encryption information for the certain categories of audio/video content for distribution in the conditional access system;
encrypting the certain categories of content with the active encryption information; and
distributing the certain categories of content encrypted with active encryption information.

22. The method of claim 20, wherein the fixed default encryption information comprises fixed default encryption keys.

23. The method of claim 22, wherein the fixed default encryption keys are unique for each of a plurality of channels.

24. A computer readable medium storing instructions which, when executed on a programmed processor, carry out the process according to claim 20.

25. A method of default encryption of audio/video content for distribution, comprising:
initializing a non-volatile default configuration memory with fixed default encryption information;
communicating with a conditional access management system to retrieve active encryption information for certain categories of the audio/video content that are always to be encrypted for distribution in a conditional access system;
encrypting the certain categories of audio/video content with the active encryption information;
distributing the certain categories of audio/video content encrypted with active encryption information;
signaling all set-top boxes within the conditional access system instructing them to use the active encryption information;
if a communication failure occurs between the conditional access management system and the conditional access system in which said communication failure results in an inability for the conditional access management system to provide the active encryption information to the conditional access encryption system which would otherwise result in the certain categories of audio/video content being distributed unencrypted:
reading the fixed default encryption information from the default configuration memory;
encrypting the certain categories of audio/video content with the default encryption information;
signaling all set-top boxes within the conditional access system instructing them to use the fixed default encryption information; and
distributing the certain categories of audio/video content encrypted with the fixed default encryption information so that the conditional access encryption system utilizes the fixed default encryption information to provide encryption to the certain categories of audio/video content that are always to be encrypted during times when the communication failure prohibits communication of live encryption keys to the conditional access encryption system.

26. The method of claim 25, further comprising:
if communication is restored between the conditional access management system and the conditional access system:
receiving active encryption information for the certain categories of audio/video content for distribution in the conditional access system;
encrypting the certain categories of audio/video content with the active encryption information;
signaling all set-top boxes within the conditional access system instructing them to use the active encryption information; and
distributing the certain categories of audio/video content encrypted with active encryption information.

27. The method of claim 25, wherein the fixed default encryption information comprises default encryption keys.

28. The method of claim 27, wherein the fixed default encryption keys are unique for each of a plurality of channels.

29. A computer readable medium storing instructions which, when executed on a programmed processor, carry out the process according to claim 25.

30. A method of default encryption of audio/video content for distribution, comprising:
initializing a non-volatile default configuration memory with fixed default encryption information;
attempting to communicate with a conditional access management system to retrieve active encryption information for certain categories of the audio/video content that are always to be encrypted for distribution in a conditional access system;
if communication cannot be established between the conditional access management system and the conditional access system such that said not establishing communication results in an inability for the conditional access management system to provide the active encryption information to the conditional access encryption system which would otherwise result in the certain categories of audio/video content being distributed unencrypted:
reading the fixed default encryption information from the default configuration memory;
encrypting the certain categories of audio/video content with the fixed default encryption information;
signaling all set-top boxes within the conditional access system instructing them to use the fixed default encryption information; and
distributing the certain categories of audio/video content encrypted with the fixed default encryption information.

31. The method of claim 30, further comprising:
if communication is achieved between the conditional access management system and the conditional access system:
receiving active encryption information for the certain categories of audio/video content for distribution in the conditional access system;
encrypting the certain categories of audio/video content with the active encryption information;
signaling all set-top boxes within the conditional access system instructing them to use the active encryption information; and
distributing the certain categories of audio/video content encrypted with active encryption information.

32. The method of claim 30, wherein the fixed default encryption information comprises fixed default encryption keys.

33. The method of claim 32, wherein the fixed default encryption keys are unique for each of a plurality of channels.

34. A computer readable medium storing instructions which, when executed on a programmed processor, carry out the process according to claim 30.

35. An apparatus for default decryption of audio/video content, comprising:
- a receiver conditional access system that provides decryption functions;
- an even decryption engine;
- an odd decryption engine;
- a memory storing odd and even decryption keys for use by the odd and even decryption engines;
- said memory also comprising non-volatile storage storing a fixed default decryption key for use to decrypt certain categories of the audio/video content that are always to be encrypted when the conditional access system receives signaling instructing it to use the default decryption key instead of the odd and even decryption keys; and
- wherein, such signaling instruction is received when a communication failure at an audio/video content provider would otherwise permit content to be provided without benefit of encryption for decryption using the odd and even decryption keys by the odd and even decryption engines so that the certain categories of audio/video content are always encrypted.

36. The apparatus of claim 35, wherein the fixed default decryption information comprises fixed default decryption keys.

37. The apparatus of claim 36, wherein the fixed default decryption keys are unique for each of a plurality of channels.

38. The apparatus of claim 35, wherein, when signaled to initialize the fixed default decryption key, the conditional access system initializes the memory with fixed default encryption information received with the signaling.

39. The apparatus of claim 35, wherein the content is decrypted with the fixed default decryption key upon reception of signaling instructing the conditional access system to use the fixed default decryption key.

40. An apparatus for default decryption of audio/video content, comprising:
- means for receiving audio/video content in a conditional access system that provides decryption functions;
- an even decryption engine;
- an odd decryption engine;
- a memory storing alternate decryption code words serving as live decryption keys for use by the odd and even decryption engines;
- means for receiving signaling in the conditional access system;
- means for storing fixed default decryption information in a non-volatile manner for audio/video content received in the conditional access system for use to decrypt the certain categories of audio/video content that are always to be encrypted when the conditional access system receives signaling instructing it to use the fixed default decryption information instead of the odd and even decryption keys, wherein such signaling instruction is received when a communication failure at an audio/video content provider would otherwise permit the certain categories of audio/video content to be provided without benefit of encryption for decryption using the odd or even decryption keys; and
- means for configuring the storing means with the fixed default decryption information,
- where the conditional access encryption system utilizes the fixed default encryption information to provide encryption to the certain categories of audio/video content that are always to be encrypted during times when the communication failure prohibits communication of live encryption keys to the conditional access encryption system.

41. The apparatus of claim 40, wherein the fixed default decryption information comprises fixed default decryption keys.

42. The apparatus of claim 41, wherein the fixed default decryption keys are unique for each of a plurality of channels.

43. The apparatus of claim 40, wherein the certain audio/video content is decrypted with the fixed default decryption information upon reception of signaling instructing the conditional access system to use the fixed default decryption information.

44. A method of default decryption of audio/video content, comprising:
- receiving audio/video content in a conditional access system that provides decryption functions, said audio/video content normally being decrypted using an even decryption engine and an odd decryption engine operating by use of active odd and even decryption keys;
- receiving signaling instructing storage of fixed default decryption information for decryption of certain audio/video content that are always to be encrypted in a conditional access system;
- receiving fixed default decryption information for use to decrypt the fixed audio/video content when the conditional access system receives signaling instructing it to use the fixed default decryption information;
- initializing a non-volatile default configuration memory with the fixed default decryption information;
- receiving active decryption information with audio/video content in the conditional access system;
- decrypting selected channels with the odd and even decryption engines using the odd and even decryption keys;
- if signaling reception instructs use of the fixed default decryption information for the conditional access system:
  - reading the fixed default decryption information for the audio/video content from the default configuration memory; and
  - decrypting audio/video content with the fixed default decryption information; and
- wherein, such signaling reception instructs use of the default decryption information when a communication failure at an audio/video content provider would otherwise permit content to be provided without benefit of encryption for decryption using the odd and even decryption keys by the odd and even decryption engines so that the certain content can always be encrypted.

45. The method of claim 44, further comprising:
- if signaling reception instructs use of active decryption information:
  - receiving active decryption information with the audio/video content in the conditional access system;
  - decrypting audio/video content with the active decryption information.

46. The method of claim 44, wherein the fixed default decryption information comprises fixed default decryption keys.

47. The method of claim 46, wherein the fixed default decryption keys are unique for each of a plurality of channels.

48. A computer readable medium storing instructions which, when executed on a programmed processor, carry out the process according to claim 44.

* * * * *

UNITED STATES PATENT AND TRADEMARK OFFICE
CERTIFICATE OF CORRECTION

PATENT NO. : 7,623,662 B2
APPLICATION NO. : 10/795929
DATED : November 24, 2009
INVENTOR(S) : Pedlow, Jr. et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1206 days.

Signed and Sealed this

Twenty-sixth Day of October, 2010

David J. Kappos
*Director of the United States Patent and Trademark Office*